(12) United States Patent
Krishnappa et al.

(10) Patent No.: US 9,696,886 B2
(45) Date of Patent: Jul. 4, 2017

(54) SYSTEMS AND METHODS FOR COMMUNICATING TASK REMINDERS ON PORTABLE ELECTRONIC DEVICES

(71) Applicant: GOOGLE TECHNOLOGY HOLDINGS LLC, Mountain View, CA (US)

(72) Inventors: Abhijith Krishnappa, Bangalore (IN); Karthik Kumar, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 181 days.

(21) Appl. No.: 14/105,168

(22) Filed: Dec. 12, 2013

(65) Prior Publication Data
US 2015/0169696 A1  Jun. 18, 2015

(51) Int. Cl.
G06F 17/30 (2006.01)
G06F 3/0484 (2013.01)
G06Q 10/10 (2012.01)

(52) U.S. Cl.
CPC .... G06F 3/04842 (2013.01); G06F 17/30575 (2013.01); G06Q 10/109 (2013.01)

(58) Field of Classification Search
CPC ......... G06F 17/30864; G06F 17/30575; G06F 3/04842; G06Q 10/109
USPC ....................................................... 707/722
See application file for complete search history.

(56) References Cited

U.S. PATENT DOCUMENTS

| | | | | |
|---|---|---|---|---|
| 8,090,415 | B2 * | 1/2012 | Annambhotla .... | G01R 31/3648 370/318 |
| 2006/0279256 | A1 * | 12/2006 | Bletsas ................. | H02J 7/0047 320/128 |
| 2011/0283296 | A1 * | 11/2011 | Chun ................ | H04M 1/72522 719/318 |
| 2012/0083258 | A1 * | 4/2012 | Rabii ................ | H04W 52/0261 455/418 |
| 2012/0210325 | A1 | 8/2012 | de Lind van Wijngaarden et al. | |
| 2012/0324259 | A1 | 12/2012 | Aasheim et al. | |
| 2015/0153810 | A1 * | 6/2015 | Sasidharan ........... | G06F 1/3212 713/320 |

* cited by examiner

*Primary Examiner* — Dinku Gebresenbet
(74) *Attorney, Agent, or Firm* — Troutman Sanders LLP; James E. Schutz; Brennan M. Carmody

(57) ABSTRACT

Embodiments are provided for communicating reminders of pending tasks to users of electronic devices before the electronic devices lose battery power. According to certain aspects, an electronic device can generate (220) a battery trigger when the battery level decreases below a certain threshold. The electronic device retrieves (224, 226) a listing of pending scheduled tasks, incomplete tasks, and routine tasks that a user may wish to complete. The electronic device presents (232) the listing of pending tasks to the user and enables the user to select (234) one or more of the pending tasks. The electronic device initiates (240) a corresponding application to enable the user to complete the selected pending task.

20 Claims, 8 Drawing Sheets

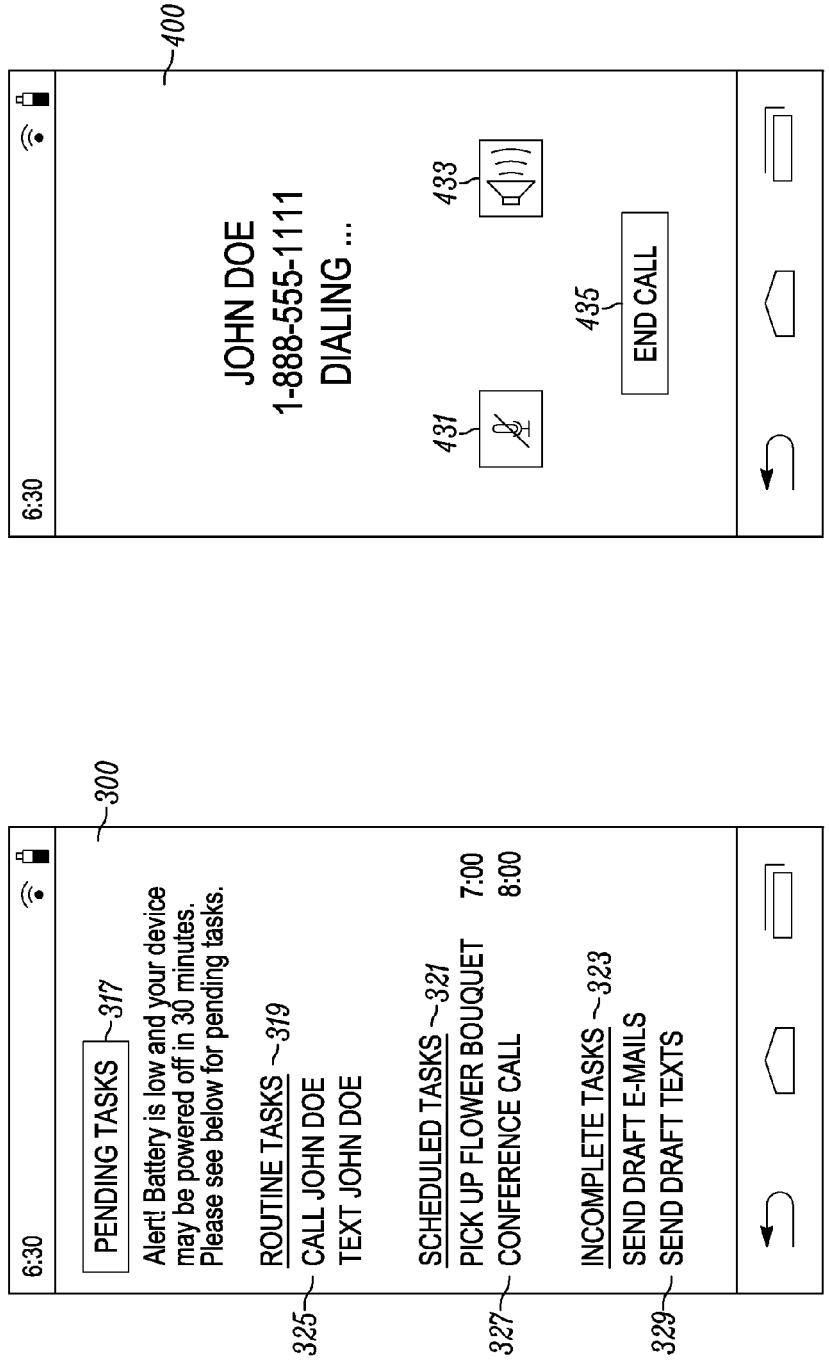

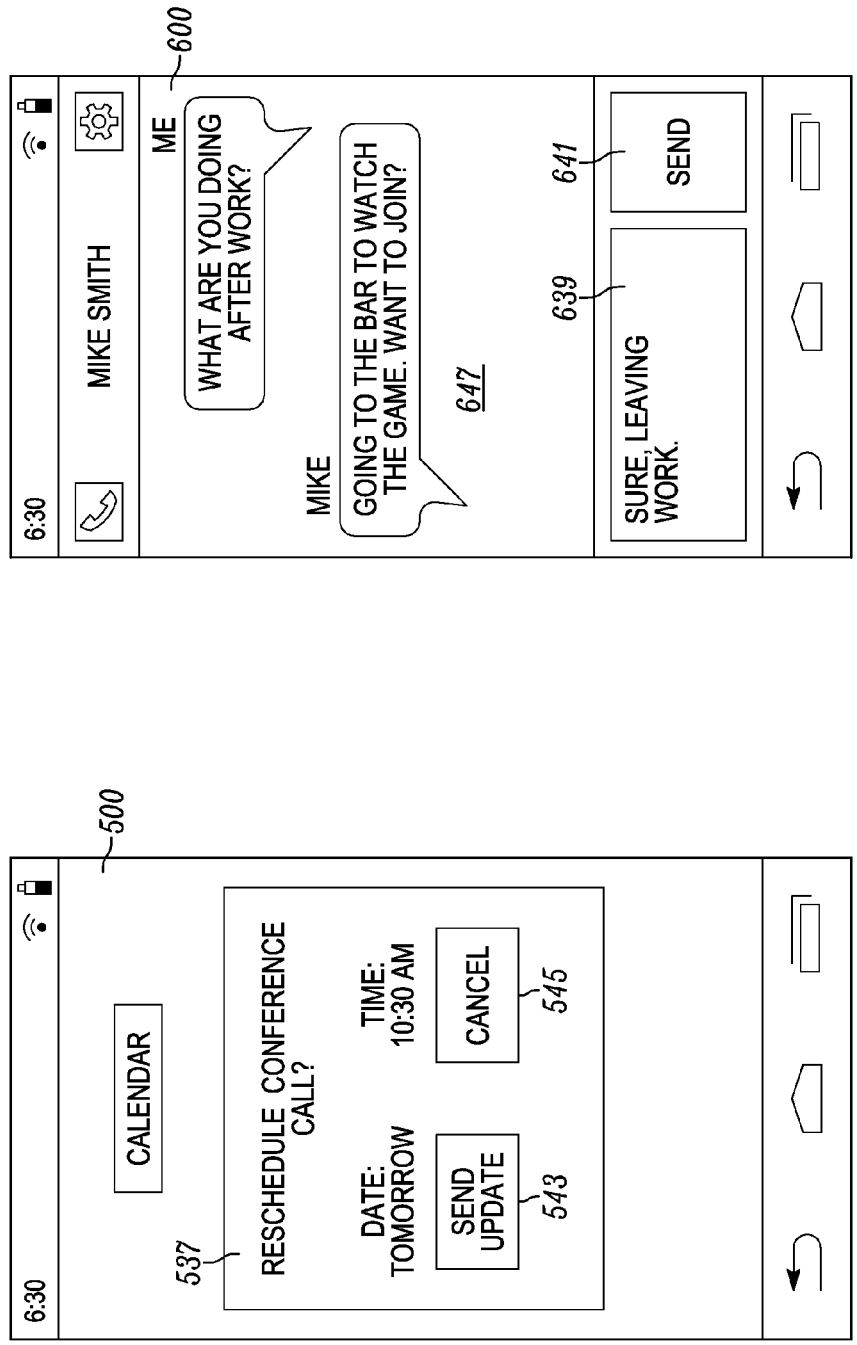

SYSTEMS AND METHODS FOR COMMUNICATING TASK REMINDERS ON PORTABLE ELECTRONIC DEVICES

FIELD

This application generally relates to improving the usability of portable electronic devices. In particular, the application relates to platforms and techniques for communicating reminders associated with pending tasks to users when the portable electronic devices are low on battery power.

BACKGROUND

As portable electronic devices such as smart phones continue to evolve and offer more diverse functionalities, users continue to increase the amount of time they interact with these electronic devices. Accordingly, the batteries of the electronic devices may lose power faster due to the increased usage. Various techniques for extended battery life in electronic devices have been implemented in existing portable electronic devices, such as battery saver applications, as well as processes for exiting idle applications and switching off background data communication when the battery is running low. However, despite these efforts, batteries of portable electronic devices eventually need recharging or replacement.

Battery drainage can lead to inconveniences for users of electronic devices. In particular, a user may not remember a scheduled appointment, and the user's electronic device may be unable to provide a reminder when its battery is drained. Further, the user may not remember to perform critical tasks that the user would otherwise perform if the electronic device had sufficient battery power. Additionally, another person is not able to communicate with the user of the electronic device when the battery of the user's device runs out of power.

Accordingly, there is an opportunity to alleviate these inconveniences when the battery power of the electronic device is low.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 3 depicts an example interface associated with a pending task list, in accordance with some embodiments.

FIGS. 4-6 depict example application interfaces initiated in response to selecting pending tasks from a pending task list, in accordance with some embodiments.

DETAILED DESCRIPTION

Embodiments as detailed herein enable effective and efficient communication of pending task reminders when a battery level of an electronic device is low. The electronic device supports a set of applications that individually support various functions and tasks that a user may wish to perform or complete. In particular, the tasks may be routine tasks that the user commonly performs in various contexts (e.g., calling a spouse at a certain time each weekday), scheduled tasks that the user has explicitly scheduled using an associated application (e.g., a scheduled doctor's appointment as recorded on a calendar application), or incomplete tasks that the user may have started but did not fully complete (e.g., a draft email).

When a battery level of the electronic device reaches a certain level, the electronic device can query various databases to identify pending tasks that the user may want to be notified of or may otherwise want to complete. Further, the electronic device can present the tasks to the user via an user interface. According to certain aspects, the electronic device may deem some of the tasks more important than other tasks, and therefore may communicate the tasks at different times as the battery reaches certain power levels. The electronic device can also enable a user to select a particular task to initiate a corresponding application. Accordingly, when the battery power is low, the user can both be reminded of the task and easily launch the application to complete the task.

The embodiments as discussed herein offer benefits to users by reminding users of various relevant tasks before an electronic device loses battery power, where the users may not have otherwise remembered the task after the battery is drained or may not have completed the tasks before the battery is drained. Further, the embodiments increase the likelihood that users will, before the battery is drained, reach out to or communicate with additional persons who may rely on communication from the users, especially if a first user routinely contacts another person at a certain time each day. It should be appreciated that additional benefits and improvements may be realized by the embodiments.

Figure 1:
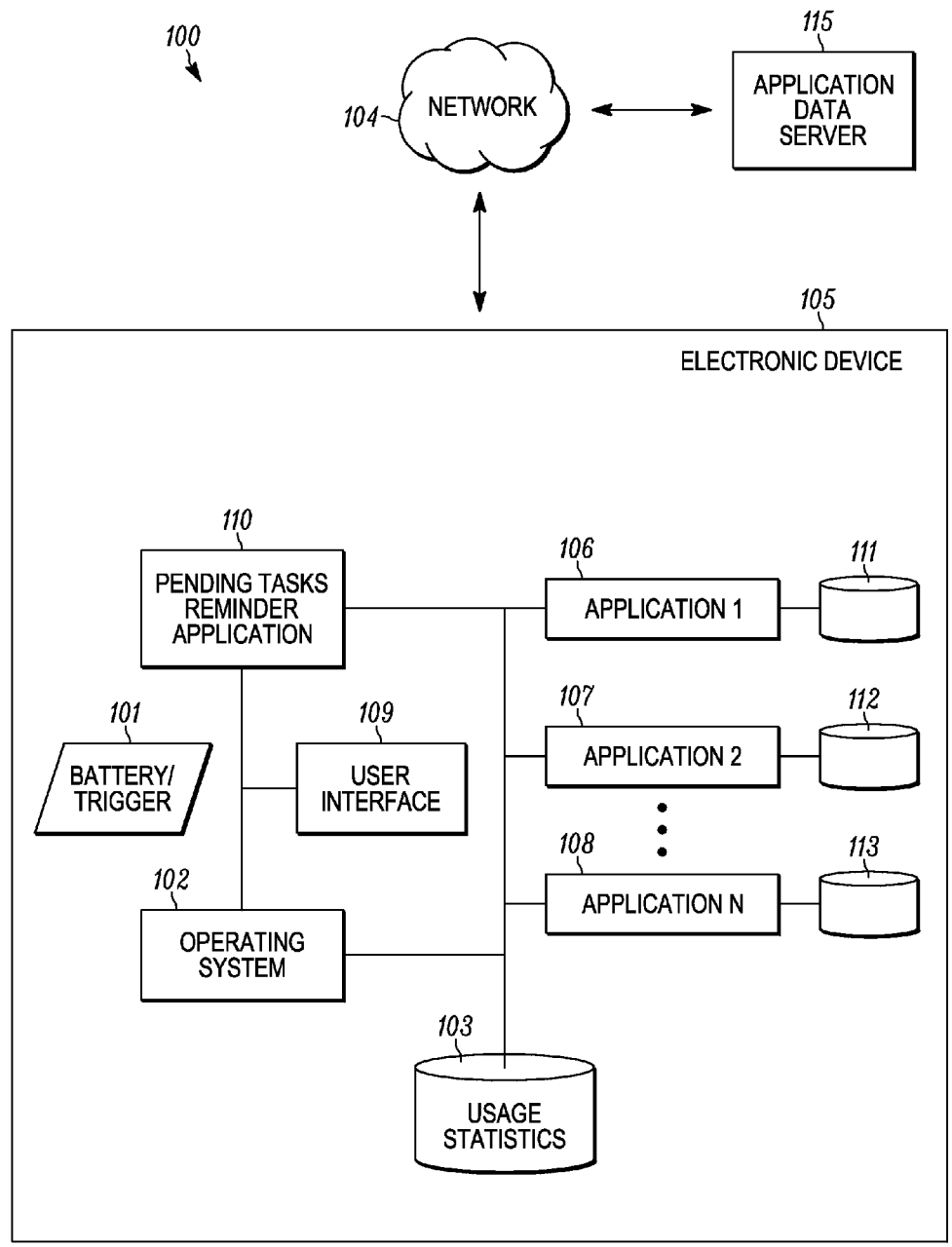
FIG. 1 depicts an example representation of an electronic device capable of facilitating the communication of pending task reminders, in accordance with some embodiments.

FIG. 1 is an example representation 100 of an electronic device 105 configured to facilitate communication of the low battery task reminders. The electronic device 105 may be any type of portable electronic device, for example, a notebook computer, a mobile phone, a Personal Digital Assistant (PDA), a smart phone, a tablet computer, a multimedia player, an MP3 player, a digital broadcast receiver, a remote controller, or any other electronic apparatus. The electronic device 105 may be powered by a rechargeable or replaceable battery, fuel cell, ultracapacitor, or similar energy storage component. The electronic device 105 includes an operating system 102 installed thereon that is configured to execute a pending tasks reminder application 110. According to embodiments, the pending tasks reminder application 110 is configured to display, present, or otherwise communicate one or more pending tasks via a user interface 109 of the electronic device 105. In particular, the pending tasks reminder application 110 may communicate the one or more pending tasks when a battery level of the electronic device 105 has decreased below one or more threshold values.

The pending tasks are associated with applications 106, 107, 108 that are installed on the electronic device 105. For example, the applications 106, 107, 108 may be calendar applications, communication applications, social networking applications, utilities, productivity applications, games, travel applications, music and entertainment applications, shopping applications, finance applications, sports applications, photography applications, mapping applications, weather applications, applications for connecting to an online marketplace, and/or other applications.

As illustrated in FIG. 1, any of the applications 106, 107, 108 can have an associated application database 111, 112, 113 that may be part of one or more memories or storage devices of the electronic device 105. The application databases 111, 112, 113 may store or include data related to operation of their respective application 106, 107, 108. For example, if the application 106 is a calendar application, the application database 111 stores data related to scheduled appointments, such as subjects, times, locations, attendees, and/or the like. In some alternative or additional embodiments, data associated with the applications 106, 107, 108 can be stored in a remote application data server 115 that the electronic device 105 can access via a network 104, such as a wired or wireless local area network (LAN/WLAN), personal area network (PAN/WPAN), or wide area network (WAN/WWAN). It should be appreciated that the network 104 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). The application data server 115 can store the same data as the application databases 111, 112, 113 or data additional to what is stored in the application databases 111, 112, 113.

Generally, the pending tasks may be of different types. In particular, a pending task may be a scheduled task, an incomplete task, or a routine task. A scheduled task can be a task that is scheduled in or by one of the applications 106, 107, 108. For example, a scheduled task may be an appointment scheduled in a calendar application, a reminder or task associated with a notes, reminder, checklist, or task application, or other types of scheduled tasks. Generally, the applications with associated scheduled tasks are configured to alert or notify a user of the electronic device when (or prior to) reaching a specified time associated with the scheduled task. For example, a calendar application may generate a pop-up notification five minutes before a scheduled appointment. Generally, data associated with the scheduled tasks of the applications 106, 107, 108 may be stored in the respective application databases 111, 112, 113 or application data server 115.

An incomplete task can be a task that is unfinished, partial, or otherwise not complete. Similar to a scheduled task, an incomplete task can also be associated with one of the applications 106, 107, 108. For example, an incomplete task may be an unsent or draft email associated with an email application, an unsent or draft text message (e.g., SMS or MMS) associated with a text messaging application, an unsent or draft instant message (IM) associated with an IM application, an open and unsaved calendar entry, or an unsaved document. An incomplete task may also be associated with operation of the electronic device 105, such as with a module of the operating system 102. For example, an incomplete task may correspond to the existence of data on a clipboard module. Generally, data associated with the incomplete tasks of the applications 106, 107, 108 may be stored in the respective application databases 111, 112, 113 or application data server 115. However, it should be appreciated that the data associated with the incomplete tasks may be stored elsewhere.

A routine task can be a task that is commonly or routinely performed in a particular context, where the context can be a temporal context such as a time of day or a day of week and/or can based on geographic location data such as a serving base station location or a GPS location. Further, the context can be based on setting data such as types of network connections (i.e., what types of networks the electronic device 105 is connected to at certain times), orientation and local motion data, ambient light or noise data, infrared data, processor state data, and other data. For example, a user of the electronic device 105 may routinely call or text a particular contact at a particular time each day and/or on a particular day of the week. For further example, the user may routinely email a status update to a particular group of recipients on each business day after 5:00 PM. Further, for example, the user may routinely respond to "friend requests" associated with a social networking application every Saturday afternoon. As an additional example, the user may check traffic at a particular time during business days when the electronic device 105 is not connected to a WLAN. It should be appreciated that other types and examples of routine tasks are envisioned.

The electronic device 105 is configured to retrieve or analyze data stored in a usage statistics database 103 to identify or determine the routine tasks. According to embodiments, the usage statistics database 103 stores operation data related to a user's interactions with or use of certain features and applications of the electronic devices 105. In particular, the usage statistics database 103 can store user interactions with the applications 106, 107, 108, or with various hardware components (e.g., sensors, communication modules, etc.) or features of the operating system 102. For example, the usage statistics database 103 can store instances of the user accessing a phone application and placing telephone calls. For further example, the usage statistics database 103 can store instances of the user activating "airplane mode" on the electronic device 105.

The usage statistics database 103 can also associate the user interaction data with certain operation or state data associated with the electronic device 105. In particular, the electronic device 105 can associate, with certain user interaction data stored in the usage statistics database 103, various sensor data, location data, network connectivity data, and/or processor state data that the electronic device 105 records in a similar temporal context as the certain user interaction data. Therefore, when determining or identifying routine tasks from data in the usage statistics database 103, the electronic device 105 can examine both the user interaction data as well other operating or state data of the electronic device 105 that was recorded when the user interaction data was recorded. For example, the usage statistics database 103 can indicate that the user, on a nightly basis, accesses an e-reader application to consume a daily publication, but only if the ambient light detected from a light sensor is at a certain threshold value. As an additional example, the usage statistics database 103 can indicate that on certain weekday mornings around 7:00 AM, the user saves or records fitness data associated with a fitness tracking application after the electronic device records motion data for a period of time (i.e., after the user has performed a workout).

According to embodiments, the pending tasks reminder application 110 can be configured to notify the user of various pending tasks, including scheduled, incomplete, and routine tasks, when the battery of the electronic device 105 is low or otherwise decreases below a certain threshold value as indicated via battery trigger 101 from the operating system 102 to the pending tasks reminder application 110. The pending tasks reminder application 110 can identify the pending tasks as those that may not be performed by the time the device loses power, and can present a list of the pending tasks in the user interface 109 of the electronic device 105. A user of the electronic device 105 can select one of the pending tasks presented in the list, and the operating system 102 may initiate an application (e.g., one of the applications 106, 107, 108) corresponding to the selected task so that the user may complete or perform the pending task before the electronic device 105 loses battery power.

Figure 2:
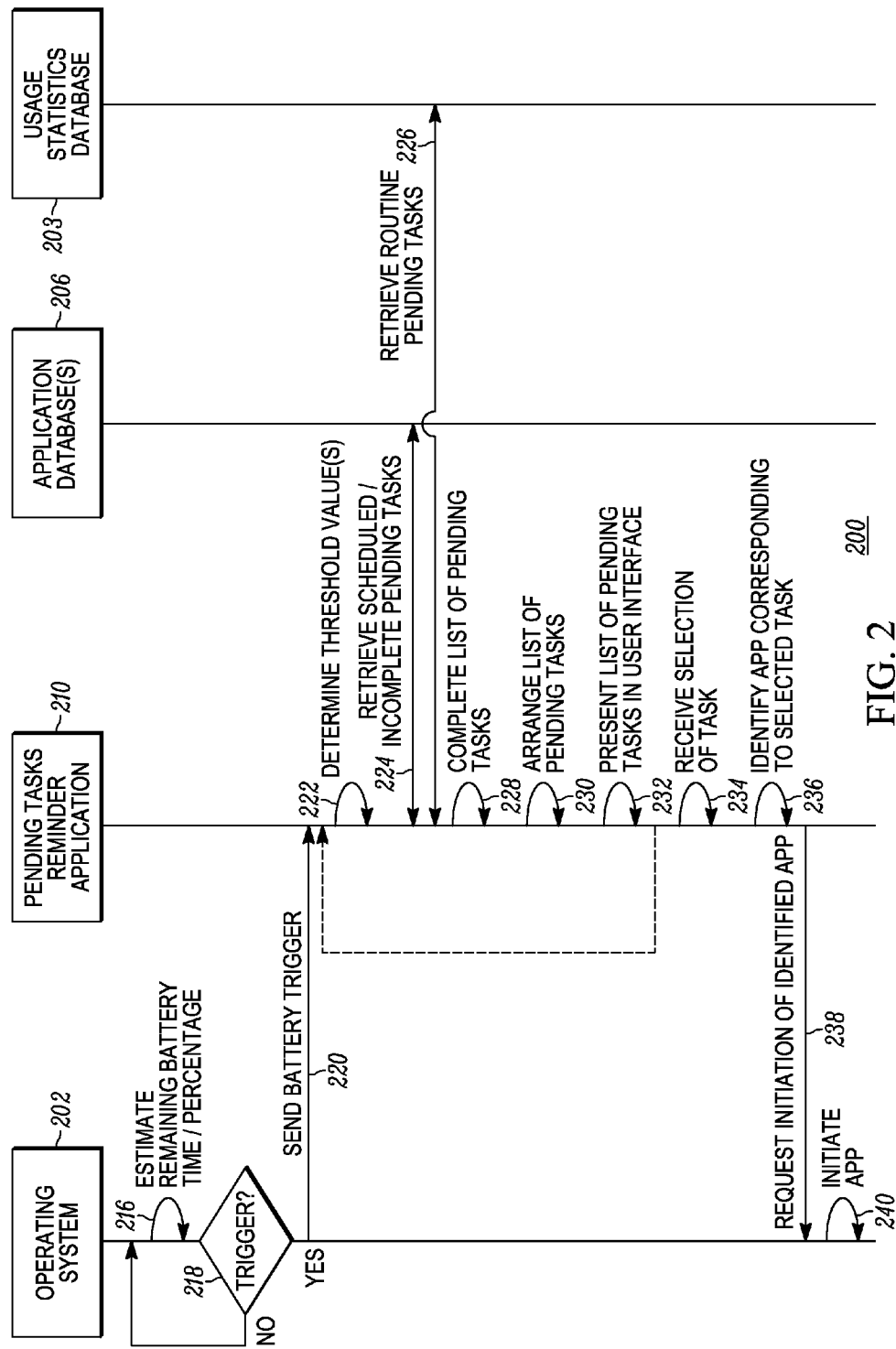
FIG. 2 depicts an example signal diagram associated with identifying pending tasks and communicating reminders for the pending tasks, in accordance with some embodiments.

FIG. 2 depicts an example signaling diagram 200 associated with identifying pending tasks and presenting the pending tasks to a user of an electronic device to enable the user to complete or perform the pending tasks before the electronic device loses battery power. The electronic device includes an operating system 202 (such as the operating system 102 discussed with respect to FIG. 1), a pending tasks reminder application 210 (such as the pending tasks reminder application 110 discussed with respect to FIG. 1), one or more application databases 206 (such as the application databases 106, 107, 108 discussed with respect to FIG. 1), and a usage statistics database 203 (such as the usage statistics database 103 discussed with respect to FIG. 1).

The functionalities can begin with the operating system 202 estimating (216) a remaining battery time or percentage for a battery of the electronic device. In particular, the operating system 102 can estimate the remaining battery time or percentage based on a current processing load of the electronic device, based on an average processing load over a specific or recent time period, based on the remaining battery charge in terms of percentage of battery capacity, or according to other techniques, algorithms, or calculations. For example, if the electronic device is streaming a video, the operating system 202 can estimate the remaining battery time with the assumption that the electronic device will continue to stream the video. For further example, the operating system 202 can estimate the remaining battery time with the assumption that the electronic device will maintain a processing load that is equal to the processing load experienced over the preceding hour-long period.

The operating system 202 can determine (218) whether to send a battery low trigger or notification to the pending tasks reminder application 210. In some embodiments, the determination can be based on the remaining battery time estimated in (216). For example, the operating system 202 can send (220) a battery trigger to the pending tasks reminder application when the estimated remaining battery time is one hour, thirty (30) minutes, fifteen (15) minutes, five (5) minutes, and/or other amounts of time. Further, the operating system 202 may send multiple battery triggers at multiple times when the estimated remaining battery time decreases below various levels. The battery triggers may also indicate the estimated remaining battery time.

After receiving the battery trigger, the pending tasks reminder application 210 can determine (222) whether the estimated remaining battery time has reached or decreased below any threshold values. Based on which, if any, threshold values the estimated remaining battery time has reached or decreased below, the pending tasks reminder application 210 can retrieve or identify certain pending tasks. In some embodiments, different threshold values can correspond to the retrieval of different types of pending tasks. For example, if the estimated remaining battery time is less than a first threshold value of forty-five (45) minutes but more than a second threshold value of thirty (30) minutes, the pending tasks reminder application 210 can retrieve routine tasks, but not scheduled or incomplete tasks. For further example, if the estimated remaining battery time is less than a lowest threshold value of fifteen (15) minutes, the pending tasks reminder application 210 can retrieve scheduled tasks, incomplete tasks, and routine tasks. In embodiments, the pending tasks reminder application 210 can be configured to retrieve the various types of pending tasks in a cascading manner. For example, when the estimated remaining battery time decreases below thirty (30) minutes, the pending tasks reminder application 210 can retrieve a list of routine tasks, when the estimated remaining battery time decreases below twenty (20) minutes, the pending tasks reminder application 210 can retrieve a list of scheduled tasks, and when the estimated remaining battery time decreases below five (5) minutes, the pending tasks reminder application 210 can retrieve a list of incomplete tasks.

Depending on the threshold value comparison (222), the pending tasks reminder application 210 can retrieve (224) the scheduled and/or incomplete tasks from the application database(s) and/or can retrieve (226) the routine tasks from the usage statistics database 203. According to embodiments, the retrieval of the pending tasks can be based on the estimated remaining battery time (and associated threshold values), as well as temporal attributes of the pending tasks such that the user may be informed of the pending tasks before the electronic device loses battery power. For example, if the current time is 18:00, the estimated remaining battery time is thirty (30) minutes, and a calendar application has two scheduled appointments at 18:45 and 20:00, the pending tasks reminder application 210 can deem that these two scheduled appointments should be presented to the user. For further example, if the current time is 09:00, the estimated remaining battery time is fifteen (15) minutes, and the usage statistics database 203 stores data indicating that the user routinely calls a particular contact at 09:30, the pending tasks reminder application 210 can deem that this routine task should be presented to the user. In embodiments, some incomplete tasks may not have a temporal attribute associated therewith, for example if the user wishes to complete incomplete tasks regardless of temporal conditions of the incomplete tasks. Therefore, the pending tasks reminder application 210 can identify incomplete tasks without considering associated temporal attributes.

The pending tasks reminder application 210 can compile (228) a list of the pending tasks retrieved from the application database(s) 206 and the usage statistics database 203. In particular, the pending tasks reminder application 210 can compile any scheduled tasks, incomplete tasks, and/or routine tasks. The pending tasks reminder application 210 can arrange (230) the list of the pending tasks. According to embodiments, the order of the arranged list can be based on relative levels of importance of the pending tasks, based on temporal attributes of the pending tasks, and/or based on other factors. For example, the pending tasks reminder application 210 can list the routine tasks first, the scheduled tasks second, and the incomplete tasks third. For further example, the pending tasks reminder application 210 can list the pending tasks in temporal order according to any scheduled times, routine performance times, or other temporal factors. As an additional example, the pending tasks reminder application 210 can order the pending tasks based on estimates of the battery power levels necessary to complete the pending tasks.

The pending tasks reminder application 210 can present (232) the list of the pending tasks in a user interface of the electronic device, therefore enabling a user to view the list of the pending tasks as well as select one or more of the pending tasks. In some embodiments, for example if the user does not select one of the pending tasks presented in the list of pending tasks, processing can return to 220 in which a different remaining battery time threshold is reached. Accordingly, the pending tasks reminder application 210 can be configured to update or add to the list of pending tasks and optionally rearrange the list of pending tasks. For example, the pending tasks reminder application 210 can first present a list of any identified routine tasks when the battery level decreases below a first threshold value, then can add any identified scheduled and/or incomplete tasks when the battery level decreases below a second threshold level. In some scenarios, the pending tasks reminder application 210 can dismiss the list of pending tasks, for example if a charger is plugged into the electronic device.

The pending tasks reminder application 210 receives (234) a selection of one of the pending tasks presented in the list of pending tasks. In particular, the pending tasks reminder application 210 can detect a touchscreen gesture, audio command, hardware or software button activation, or other type of user selection. Responsive to receiving the selection, the pending tasks reminder application 210 can identify (236) an application corresponding to the selected pending task. In some embodiments, the identified application may be the application that generated or is otherwise already associated with the selected pending task. For example, if the selected pending task indicates a calendar appointment, the pending tasks reminder application 210 can identify a calendar application. For further example, if the selected pending task indicates that the user routinely texts a particular contact at a certain time, the pending tasks reminder application 210 can identify a text messaging application. In other embodiments, the identified application may be an application that is sometimes associated with the selected pending task, or that is explicitly selected (e.g., by the user) to be associated with the selected pending task. For example, if the selected pending task indicates an unsent email, the pending task reminder application 210 can identify a reminder application that the user may like to use to set a reminder about the unsent email.

After identifying the application corresponding to the selected pending task, the pending task reminder application 210 can request (238) the operating system 202 to initiate the identified application, and the operating system 202 can initiate (240) the identified application. Accordingly, the user can use the initiated application to complete the selected pending task or perform other functionalities.

FIGS. 3-6 depict example interfaces associated with the pending task communication techniques as discussed herein. An electronic device can display the example interfaces on a user interface (such as the user interface 109 discussed with respect to FIG. 1) and enable a user to interact with the example interfaces via the user interface.

As illustrated in FIG. 3, an example interface 300 presents a list of pending tasks 317 that are identified by a pending task reminder application. The interface 300 can inform the user that the battery of the electronic device is low and can indicate the estimated remaining battery time. In some embodiments, the interface 300 can indicate a percentage of the battery charge that remains. The list of pending tasks 317 can include a list of routine tasks 319 that indicates one or more routine tasks that the user generally performs at a certain time, a list of scheduled tasks 321 that indicates one or more tasks that are scheduled at a certain time (and indicates the scheduled times), and a list of incomplete tasks 323 that indicates one or more tasks that are incomplete.

The interface 300 enables a user to select one or more of the tasks in the list of pending tasks 317. For example, the user can select a task 325 to "call John Doe," which has a telephone application as its corresponding application. Accordingly, the electronic device can initiate the telephone application and display an example interface 400 as illustrated in FIG. 4. In some cases, the telephone application can automatically place a call to John Doe in response to the user selecting the task 325. Accordingly, the interface 400 indicates an outgoing call to John Doe and includes selections for muting 431, speaker phone 433, and ending 435 the call (and/or other selections).

For further example, the user can select a task 327 from the list of pending tasks 317 that indicates a conference call that is scheduled at 8:00, which has a calendar application as its corresponding application. Accordingly, the electronic device can initiate the calendar application and display an example interface 500 as illustrated in FIG. 5. The example interface 500 includes a window 537 that indicates an option to reschedule the conference call as well as a selection 543 to send any associated rescheduling updates to meeting attendants, and a selection 545 to cancel the window 537 and not reschedule the conference call.

Further, for example, the user can select a task 329 from the list of pending tasks 317 that indicates an unfinished or draft text message, which has a text messaging application as its corresponding application. Accordingly, the electronic device can initiate the text messaging application and display an example interface 600 as illustrated in FIG. 6. The example interface 600 includes an existing conversation 647 with the receiving user as well as a text entry box 639 that indicates the draft text message. The user can input additional text into the text entry box 639 and can select a send selection 641 to send the text message to the receiving user.

Figure 7:
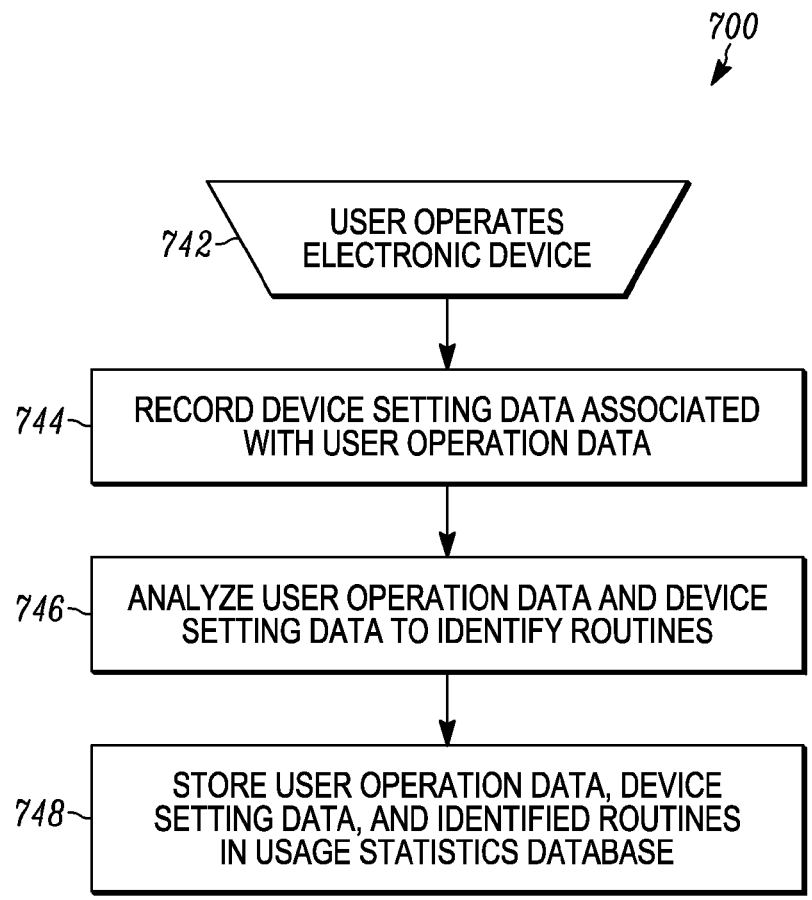
FIG. 7 depicts a flow diagram of analyzing user operation data associated with an electronic device, in accordance with some embodiments.

FIG. 7 is a flowchart of a method 700 for an electronic device (such as the electronic device 105) to process user operation data. The order of the steps of the depicted flowchart of FIG. 7 can differ from the version shown, and certain steps can be eliminated, and/or certain other ones can be added, depending upon the implementation. The method 700 begins with the user operating 742 on the electronic device. The operating may be application usage, setting modifications, and/or other general usage. The electronic device also records 744 certain device setting data associated with the user operation data. For example, the device setting data can be network connectivity data, location data, processor state data, and sensor data such as orientation data, local motion data, ambient light data, infrared data, ambient noise data, and/or others data.

The electronic device analyzes 746 the user operation data and the device setting data to identify routines that the user consistently or commonly performs. According to embodiments, the routines have a temporal aspect. For example, the user can routinely check a social network feed at 7:00 AM on weekday mornings when the electronic device is located along a public transportation route. The electronic device stores 748 the user operation data, device setting data, and any identified routines in a usage statistics database. Accordingly, the electronic device can later retrieve the identified routines as well as analyze the stored data in combination with any new operation data and device setting data that the electronic device records to potentially modify existing routines or identify new routines.

Figure 8A:
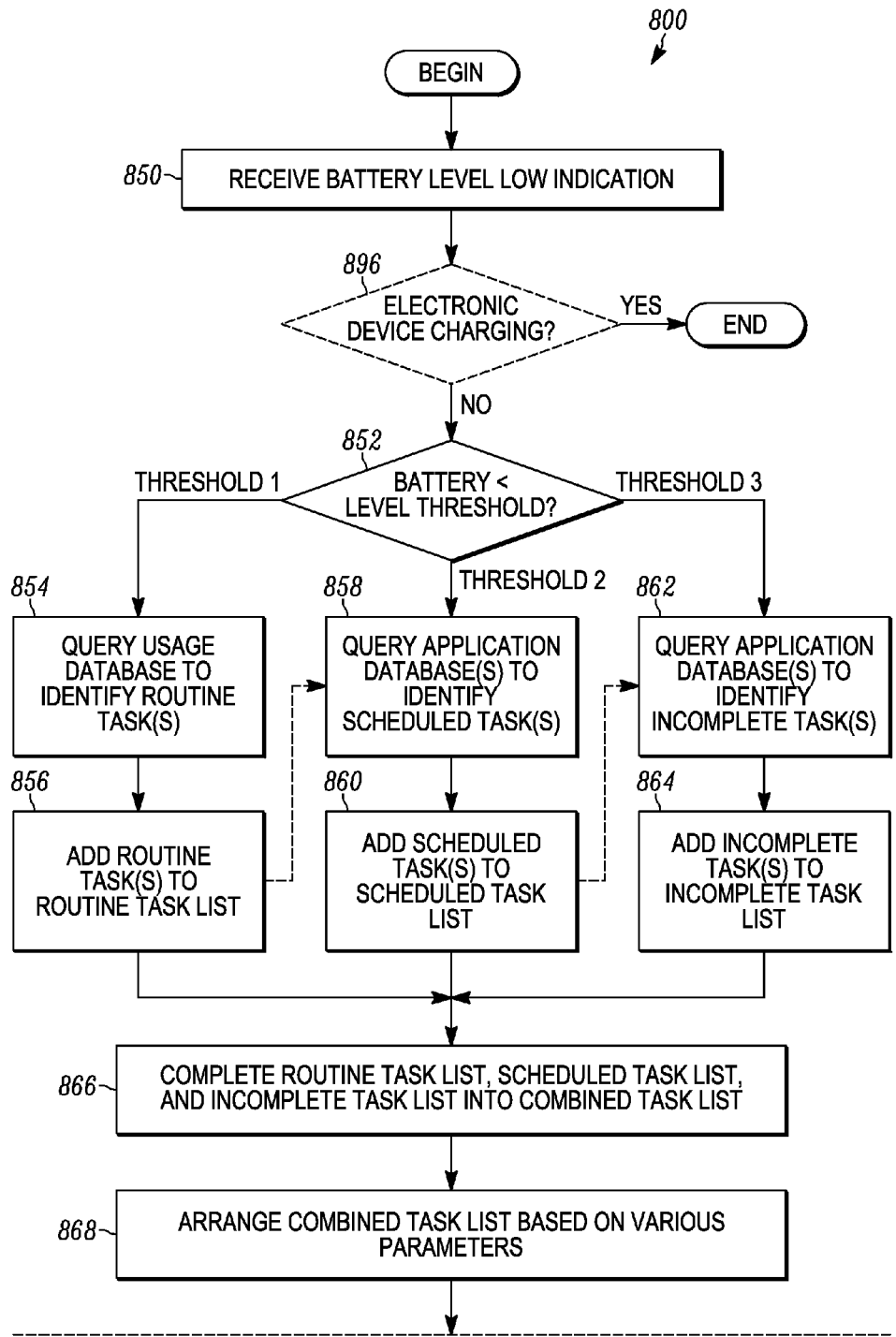
FIGS. 8A and 8B depict a flow diagram of identifying pending tasks and communicating reminders for the pending tasks, in accordance with some embodiments.
Figure 8B:
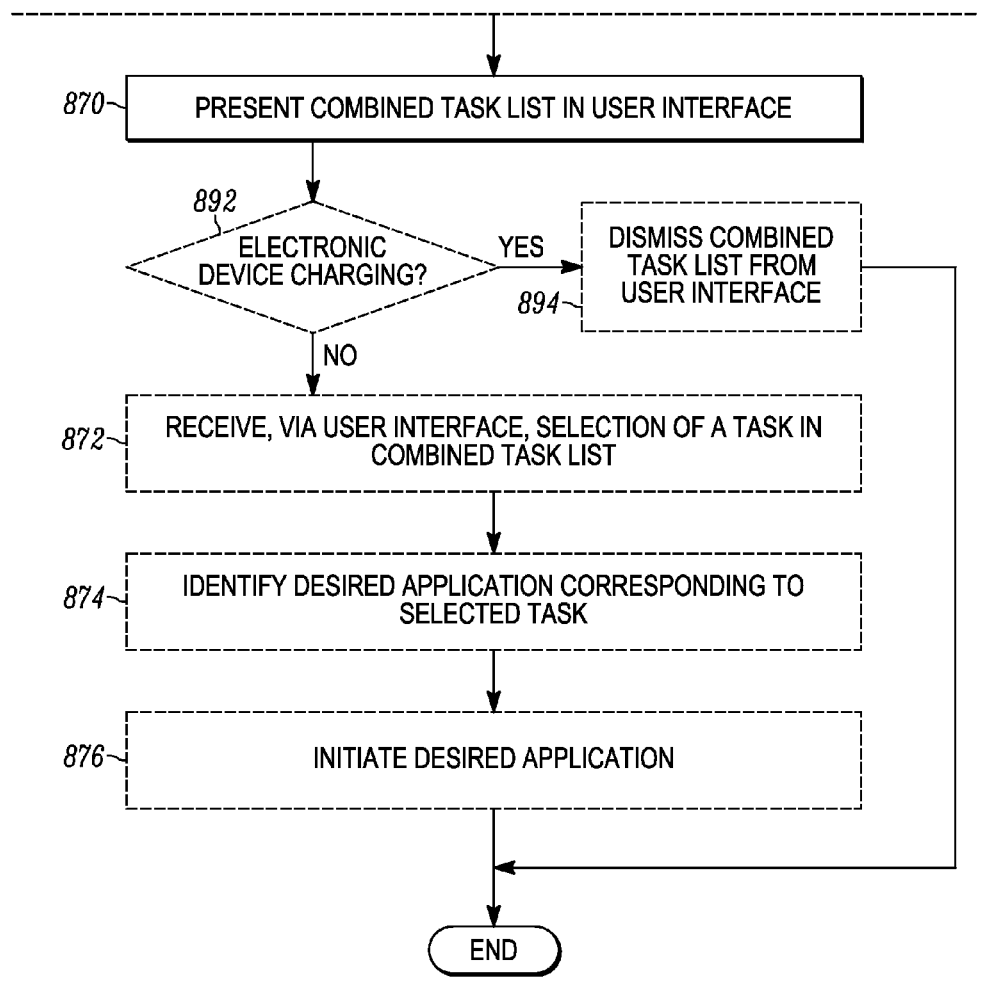

FIG. 8 is a flowchart of a method 800 for an electronic device (such as the electronic device 105) to identify pending tasks and communicate reminders for the pending tasks. The order of the steps of the depicted flowchart of FIG. 8 can differ from the version shown, and certain steps can be eliminated, and/or certain other ones can be added, depending upon the implementation. The method 800 begins with the electronic device receiving 850 a battery level low indication. In particular, a pending tasks reminder application can receive a battery level trigger from an operating system, where the battery level trigger can indicate an estimated remaining battery time for the battery of the electronic device.

In an optional embodiment, the electronic device determines 896 whether it is charging, for example if a user of the electronic device plugs a charger into the electronic device. If the electronic device is not charging ("NO"), processing can proceed to 852. If the electronic device is charging ("YES"), processing can end or proceed to other functionality.

The electronic device compares 852 the battery level (and specifically the estimated remaining battery time) to various threshold values to determine if the battery level has decreased below any of the threshold values. In embodiments, each threshold value can correspond to a type of pending task to retrieve. Further, the pending tasks can each have a temporal attribute that suggests that the corresponding pending task might be completed or triggered after the electronic device loses power.

As illustrated in FIG. 8, if the battery level has decreased below a "THRESHOLD 1" (e.g., thirty (30) minutes) that corresponds to routine tasks, the electronic device queries 854 a usage statistics database to identify any routine task(s) that should be presented to the user. In embodiments, the usage statistics databases stores data in accordance with functionalities discussed with respect to FIG. 7. The electronic device further adds 856 the routine task(s) to a routine task list. If the battery level has decreased below a "THRESHOLD 2" (e.g., fifteen (15) minutes) that corresponds to scheduled tasks, the electronic device queries 858 one or more application databases to identify any scheduled task(s) that should be presented to the user. The electronic device further adds 860 the scheduled task(s) to a scheduled task list. If the battery level has decreased below a "THRESHOLD 3" (e.g., five (5) minutes) that corresponds to incomplete tasks, the electronic device queries 862 one or more application databases to identify any incomplete task(s) that should be presented to the user. The electronic device further adds 864 the incomplete task(s) to an incomplete task list. In some optional embodiments, the electronic device queries both the usage statistics database and the one or more application databases to identify routine tasks, scheduled tasks, and incomplete tasks, and generates the corresponding task lists, without determining whether the battery level has decreased below certain threshold levels.

The electronic device compiles 866 the routine task list, the scheduled task list, and the incomplete task list into a combined task list. In particular, the combined task list includes all of the pending tasks that are identified from the usage statistics database and the one or more application databases. The electronic device also arranges 868 the combined task list based on various parameters or attributes. For example, the electronic device can arrange the combined task list based on levels of importance, timing attributes, estimated power levels to complete the tasks, and/or other parameters.

The electronic device presents 870 the combined task list in a user interface so that a user of the electronic device can be notified that the electronic device is running low on battery and can view the list of pending tasks. In an optional embodiment, the electronic device determines 892 whether it is charging, for example if a user of the electronic device plugs a charger into the electronic device. If the electronic device is charging ("YES"), the electronic device optionally dismisses 894 the combined task list from the user interface, and processing can end or proceed to other functionality. If the electronic device is not charging ("NO"), processing can proceed to 872 at which the electronic device receives, via the user interface, a selection of a task presented in the combined task list. The electronic device identifies 874 a desired application corresponding to the selected task. In some cases, the desired application can be an application that generated the selected task or is otherwise associated with the selected task. In other cases, the desired application can be an application that is sometimes associated with the selected task, or that is explicitly selected (e.g., by a user of the electronic device) to be associated with the selected task. After identifying the desired application, the electronic device initiates 876 the desired application to enable the user to complete the selected task or perform other functionalities.

Figure 9:
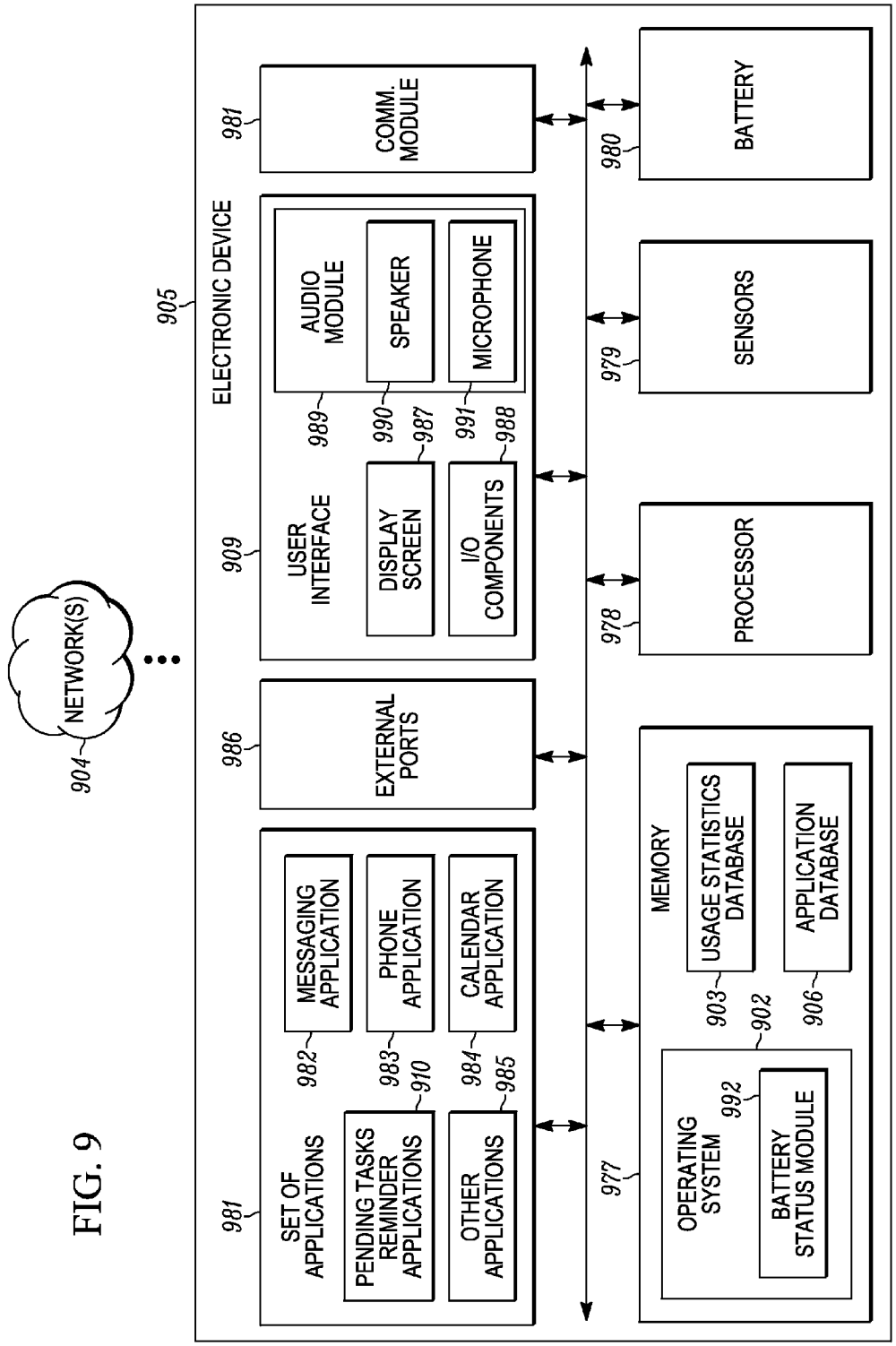
FIG. 9 is a block diagram of an electronic device in accordance with some embodiments.

FIG. 9 illustrates an example electronic device 905 (such as the electronic device 105 discussed with respect to FIG. 1, or other devices) in which the functionalities as discussed herein may be implemented. The electronic device 905 can be powered by a battery 980, and can include a processor 978 or other similar type of controller module or microcontroller, as well as a memory 977. The memory 977 can store an operating system 902 capable of facilitating the functionalities as discussed herein. The operating system 902 can be configured with (or be configured to interface with) a battery status module 992 to detect that a level of the battery 980 is low and to generate a battery low trigger. The processor 978 can interface with the memory 977 to execute the operating system 902 and a set of applications 981. The set of applications 981 (which the memory 977 can also store) can include a pending tasks reminder application 910 configured to facilitate the pending task communication techniques as discussed herein. The set of applications 981 can also include a messaging application 982, a phone application 983, a calendar application 984, as well as one or more other applications 985 such as, for example, social networking applications, utilities, productivity applications, games, travel applications, communication applications, music and entertainment applications, shopping applications, finance applications, sports applications, photography applications, mapping applications, weather applications, applications for connecting to an online marketplace, and/or other applications.

The memory 977 can store a usage statistics database 903 that includes user operation data and device settings data, and one or more application databases 906 associated with the set of applications 981. According to embodiments, the pending tasks reminder application 910 can interface with the usage statistics database 903 to identify routine tasks, and can interface with the application databases 906 to identify scheduled tasks and incomplete tasks. Generally, the memory 977 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 905 can further include a communication module 981 configured to interface with one or more external ports 986 to communicate data via one or more networks 904. For example, the communication module 981 can leverage the external ports 986 to establish a wide area network for connecting the electronic device 905 to other components such as a remote application data server. According to some embodiments, the communication module 981 can include one or more transceivers functioning in accordance with IEEE standards, 3GPP standards, or other standards, and configured to receive and transmit data via the one or more external ports 986. More particularly, the communication module 981 can include one or more WWAN, WLAN, and/or WPAN transceivers configured to connect the electronic device 905 to wide area networks, local area networks, and/or personal area networks.

The electronic device 905 can further include one or more sensors 979 such as, for example, imaging sensors, light sensors, infrared sensors, GPS sensors, accelerometers, touch sensors, NFC components, and other sensors. In embodiments, the usage statistics database 903 can be configured store data from the sensors 979. The electronic device 905 may include a user interface 909 to present information to the user and/or receive inputs from the user. As shown in FIG. 9, the user interface 909 includes a display screen 987 and I/O components 988 (e.g., capacitive or resistive touch sensitive input panels, keys, buttons, lights, LEDs, cursor control devices, haptic devices, and others). In embodiments, the display screen 987 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 909 may further include an audio module 989 including hardware components such as a speaker 990 for outputting audio data and a microphone 991 for detecting or receiving audio.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 978 (e.g., working in connection with the operating system 902) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods offer improved electronic device usability. The embodiments advantageously enable users of electronic devices to quickly ascertain certain pending tasks that the users may wish to complete before the electronic devices lose battery power. Additionally, the embodiments intelligently identify the pending tasks based on temporal contexts and other factors so as to avoid notifying the user of non-relevant pending tasks.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method on an electronic device for generating task reminders, the method comprising:
   monitoring, by a processor, a battery level of the electronic device;
   detecting, by the processor, that the battery level of the electronic device has decreased below a first threshold value;
   in response to detecting that the battery level of the electronic device has decreased below the first threshold value, querying, by the processor, a plurality of additional applications of the electronic device or an operating system of the electronic device to identify a plurality of pending user-completable tasks, the querying comprising querying a usage statistics database of the electronic device to identify at least one routine task that is routinely performed by the user in a specific environmental context, wherein the pending user-completable tasks are functions associated with applications executable by the operating system;
   generating, by the processor in response to identifying the plurality of pending user-completable tasks, a task list including the plurality of pending user-completable tasks including the at least one routine task; and
   presenting the generated task list in a user interface of the electronic device.

2. The method of claim 1, wherein
   querying, by the processor, the plurality of additional applications or the operating system further comprises:
   querying a database of the plurality additional applications to identify at least one scheduled task that is scheduled at an upcoming time, and
   the plurality of pending user-completable tasks further comprises the at least one identified scheduled task.

3. The method of claim 1, wherein
   querying, by the processor, the plurality of additional applications or the operating system further comprises:
   querying a database of the plurality additional applications to identify at least one incomplete task, and
   the plurality of pending user-completable tasks further comprises the at least one identified incomplete task.

4. The method of claim 1, wherein querying the usage statistics database to identify the at least one routine task comprises:
   analyzing data of the usage statistics database to identify the at least one routine task based on at least one of: a location of the electronic device, a time of day, a day of the week, sensor data, or a presence of available network connections.

5. The method of claim 1, wherein generating the task list comprises:

for each of the plurality of pending user-completable tasks, analyzing at least one of: a level of importance, an associated time, or an estimated power level for completing the pending task;

determining a priority for each the plurality of pending user-completable tasks relative to a priority for each of the other pending user-completable tasks of the plurality based on the analyzing; and arranging the plurality of pending user-completable tasks in the task list based on the priority for each the plurality of pending user-completable tasks.

6. The method of claim 1, further comprising:
receiving, via the user interface, a user selection of at least one pending task presented in the task list;
identifying a desired application corresponding to the at least one pending task in the task list; and
initiating the desired application on the electronic device.

7. The method of claim 6, wherein identifying the desired application comprises:
identifying one of the plurality of additional applications.

8. The method of claim 1, wherein querying, by the processor, the plurality of additional applications or the operating system comprises:
responsive to detecting that the battery level has decreased below the first threshold value, querying the operating system to identify a first pending task of the plurality of pending user-completable tasks;
detecting that the battery level has decreased below a second threshold value that is less than the first threshold value; and
querying at least one of the plurality of additional applications to identify a second pending task of the plurality of pending user-completable tasks.

9. The method of claim 1, wherein detecting, by the processor, that the battery level has decreased below the first threshold value comprises:
receiving, from the operating system of the electronic device, a trigger indicating that the battery level has decreased below the first threshold value.

10. An electronic device comprising:
a battery configured to power the electronic device;
a memory configured to store an operating system and a set of applications executable by the operating system;
a user interface; and
a processor configured to interface with the memory and the user interface, and to execute a first application of the set of applications executable by the operating system to perform operations comprising:
monitoring a battery level of the battery;
detecting that the battery level of the battery has decreased below a first threshold value,
in response to detecting that the battery level of the electronic device has decreased below the first threshold value, querying a plurality of additional applications of the set of applications executable by the operating system or the operating system to identify a plurality of pending user-completable tasks, the querying comprising querying a usage statistics database of the electronic device to identify at least one routine task that is routinely performed by the user in a specific environmental context, wherein the pending user-completable tasks are functions associated with at least one application of the set of applications executable by the operating system;
generating, by the processor in response to identifying the plurality of pending user-completable tasks, a task list including the plurality of pending user-completable tasks including the at least one routine task, and
causing the user interface to present the generated task list.

11. The electronic device of claim 10, wherein
the memory is further configured to store an application database associated with the plurality of additional applications, and wherein the first application queries the plurality of additional applications or the operating system further by:
querying the application database to identify at least one scheduled task that is scheduled at an upcoming time, and
the plurality of pending user-completable tasks further comprises the at least one identified scheduled task.

12. The electronic device of claim 10, wherein
the memory is further configured to store an application database associated with the plurality of additional applications, and wherein the first application queries the plurality of additional applications or the operating system further by:
querying the application database to identify at least one incomplete task, and
the plurality of pending user-completable tasks further comprises the at least one identified incomplete task.

13. The electronic device of claim 10, wherein the first application queries the usage statistics database to identify the at least one routine task by:
analyzing data of the usage statistics database to identify the at least one routine task based on at least one of: a location of the electronic device, a time of day, a day of the week, sensor data, or a presence of available network connections.

14. The electronic device of claim 10, wherein the first application generates the task list by:
for each of the plurality of pending user-completable tasks, analyzing at least one of: a level of importance, an associated time, or an estimated power level for completing the pending task,
determining a priority for each the plurality of pending user-completable tasks relative to a priority for each of the other pending user-completable tasks of the plurality based on the analyzing, and
arranging the plurality of pending user-completable tasks in the task list based on the priority for each the plurality of pending user-completable tasks.

15. The electronic device of claim 10, wherein the processor executes the first application to perform operations further comprising:
receiving, via the user interface, a user selection of at least one pending task presented in the task list,
identifying a desired application of the set of applications that corresponds to the at least one pending task in the task list, and
initiating the desired application.

16. The electronic device of claim 15, wherein the first application identifies the desired application by:
identifying a second application of the plurality of additional applications.

17. The electronic device of claim 10, wherein the first application queries the plurality of additional applications or the operating system by:
responsive to detecting that the battery level has decreased below the first threshold value, querying the operating system to identify a first pending user-completable task of the plurality of pending user-completable tasks, detecting that the battery level has decreased below a second threshold value that is less than the first threshold value, and querying at least one second application of the plurality of additional applications to identify a second pending task of the plurality of pending user-completable tasks.

18. The electronic device of claim 10, wherein the first application detects that the battery level has decreased below the first threshold value by:

receiving, from the operating system, a trigger indicating that the battery level has decreased below the first threshold value.

19. The method of claim 1, wherein the at least one routine task comprises the user routinely calling, texting, or e-mailing a contact at a certain time of day or day of the week.

20. The method of claim 1 further comprising:

detecting, by the processor, that the battery level of the electronic device has decreased below a second threshold value that is less than the first threshold value;

responsive to detecting that the battery level of the electronic device has decreased below the second threshold:

querying a database of the plurality additional applications to identify at least one incomplete task, and updating, by the processor in response to identifying the at least one incomplete tasks, the task list to include the at least one incomplete task;

detecting, by the processor, that the battery level of the electronic device has decreased below a third threshold value that is less than the second threshold value; and responsive to detecting that the battery level of the electronic device has decreased below the third threshold:

querying a database of the plurality additional applications to identify at least one scheduled task that is scheduled at an upcoming time, and updating, by the processor in response to identifying the at least one tasks, the task list to include the at least one scheduled task.

* * * * *